US008730937B2

(12) United States Patent
Wang et al.

(10) Patent No.: US 8,730,937 B2
(45) Date of Patent: May 20, 2014

(54) METHOD AND AN APPARATUS FOR SYNCHRONIZATION AMONG THE NEIGHBORING BASE STATIONS IN THE WIRELESS COMMUNICATION SYSTEM

(75) Inventors: Yonggang Wang, Shanghai (CN); Zhongji Hu, Shanghai (CN); Yu Chen, Shanghai (CN)

(73) Assignee: Alcatel Lucent, Paris (FR)

( * ) Notice: Subject to any disclaimer, the term of this patent is extended or adjusted under 35 U.S.C. 154(b) by 1419 days.

(21) Appl. No.: 12/376,535

(22) PCT Filed: Jul. 16, 2007

(86) PCT No.: PCT/CN2007/002162
§ 371 (c)(1),
(2), (4) Date: May 20, 2010

(87) PCT Pub. No.: WO2008/019568
PCT Pub. Date: Feb. 21, 2008

(65) Prior Publication Data
US 2010/0296491 A1 Nov. 25, 2010

(30) Foreign Application Priority Data
Aug. 9, 2006 (CN) .......................... 2006 1 0029863

(51) Int. Cl.
*H04B 7/005* (2006.01)
*H04B 1/44* (2006.01)
*H04B 7/212* (2006.01)
*H04J 3/06* (2006.01)
*H04L 7/00* (2006.01)

(52) U.S. Cl.
USPC ........... 370/350; 370/278; 370/282; 370/324; 375/356

(58) Field of Classification Search
USPC ......... 370/278, 280, 282, 324, 336–337, 350, 370/395.62, 503, 507–510; 375/356
See application file for complete search history.

(56) References Cited

U.S. PATENT DOCUMENTS

| 6,112,100 | A  | * | 8/2000  | Ossoinig et al. ............... 455/502 |
| 6,125,138 | A  | * | 9/2000  | Kumagai ....................... 375/219 |
| 6,965,633 | B2 | * | 11/2005 | Sun et al. ....................... 375/145 |
| 7,110,781 | B1 | * | 9/2006  | Hulbert et al. ................. 455/502 |
| 7,778,226 | B2 | * | 8/2010  | Rayzman et al. ............. 370/337 |

(Continued)

FOREIGN PATENT DOCUMENTS

CN 1535512 A 10/2004

OTHER PUBLICATIONS

Yang, Xuemei et al., "Discussion of the Synchronization Technique in TD-SCDMA," Data Communication , No. 5 (Oct. 31, 2003).
International Search Report.

*Primary Examiner* — Redentor Pasia
(74) *Attorney, Agent, or Firm* — Fay Sharpe LLP

(57) ABSTRACT

The object of the present invention is to provide a method and an apparatus for performing synchronization among neighboring base stations in the wireless communication network. According to the technical solution of the present invention, a base station turns off a transmitter randomly to receive a synchronization signal from neighboring base stations, and obtains a new local synchronization reference time based on the synchronization reference time of other neighboring base station. With the apparatus and the method provided by the present invention, the strongly robust synchronization among base stations is realized.

10 Claims, 7 Drawing Sheets

(56) References Cited

U.S. PATENT DOCUMENTS

| | | | |
|---|---|---|---|
| 2002/0009168 A1* | 1/2002 | Dick et al. | 375/356 |
| 2004/0023693 A1* | 2/2004 | Okawa et al. | 455/562.1 |
| 2006/0034250 A1* | 2/2006 | Kim et al. | 370/350 |
| 2006/0187862 A1* | 8/2006 | Lee et al. | 370/294 |
| 2008/0240072 A1* | 10/2008 | Bykovnikov | 370/350 |

* cited by examiner

METHOD AND AN APPARATUS FOR SYNCHRONIZATION AMONG THE NEIGHBORING BASE STATIONS IN THE WIRELESS COMMUNICATION SYSTEM

TECHNICAL FIELD

The present invention relates to the wireless communication system, particularly to a method and an apparatus for the synchronization among base stations in the wireless communication system.

BACKGROUND OF THE INVENTION

In the wireless communication system adopting OFDM (Orthogonal Frequency Division Multiplexing), if not all of the base stations in a cell are equipped with GPS (Global Positioning System) or Galileo synchronization system, in order to carry out related combination, a synchronization method with an accuracy of microsecond level is required to realize strict synchronization among base stations. If the synchronization among base stations can not satisfy the above-mentioned requirement, a signal arriving at the user equipment receiver may be outside the CP window, which will lead to the inter-symbol interference and affect pilot estimation and data receipt.

Solutions of realizing the aforementioned synchronization in the prior art comprise:

1. A method proposed in 3GPP UTRAN TDD (UMTS Terrestrial Radio Access Network Time Division Duplex), namely the synchronization among a plurality of base stations is realized by using an input synchronization port and an output synchronization port of a base station (also referred to as Node B). As shown in FIG. 1, with its input synchronization port, a base station A receives a synchronization signal sent from an external reference source (e.g. GPS) via the cable between them, so that it can be synchronized with the external reference source; likewise, with the output synchronization port, the base station A sends a synchronization signal to a base station B via the cable between them, then the base station B is indirectly synchronized to the external reference source by way of being synchronized to the base station A. The synchronization of other base stations shown in FIG. 1 can be deduced by analogy.

By using the synchronization method that base stations are connected via cable directly, the base stations to be synchronized are only required to be connected in the form of a chain. All of the base stations on the chain can be synchronized by using only one external time reference source.

The drawback of the solution lies in its weak robustness. If a problem appears in the synchronization of a base station (e.g. the synchronization port can not work properly), then every base station in the downstream of the synchronization chain can not be synchronized with those synchronized base stations;

The weakness of the solution further lies in that synchronization error will be accumulated with the increase of the number of base stains on the chain, namely error accumulation will occur, which makes the variance of the error larger.

2. A synchronization method adopted in WCDMA TDD and TD-SCDMA systems, synchronization among base stations can be realized by transmitting cell synchronization time reference in predefined Physical Random Access Channel (PRACH) or Downstream Pilot Channel (DWPCH) on the air interface.

In this solution, Radio Network Controller (RNC) prearranges transmission time slot. No matter whether the synchronization burst is transmitted in PRACH or DWPCH, at least one base station in a cell cluster is connected with the external time reference source (e.g. GPS), other base stations are then synchronized with the base stations connected with the external time reference source. While controlling the transmission of base station synchronization reference signal and the execution of measurement, RNC is also responsible for sending the time adjustment instruction based on synchronization difference signal reported by base stations. Therefore, RNC is the master controller of the whole synchronization process.

The disadvantage of the solution is that the synchronization process of a base station requires that a base station belonging to an upper layer or a master base station works as a control base station controlling the transmission of time reference signals and the receipt of time slots, so that the transmitter and the receiver coordinate with each other. This is only applicable for TDD mode and can not be realized in FDD (Frequency Division Duplex) mode.

Hence, there is an urgent need to propose a new synchronization solution that can avoid the aforementioned problems at the same time when strict synchronization among base stations is realized.

SUMMARY OF THE INVENTION

The object of the present invention is to provide an optimal solution of synchronization among base stations. To realize the above technical object:

According to the first aspect of the present invention, there is provided a method for performing synchronization in a synchronization apparatus of a network device of the wireless communication network based on synchronization signals from one or more neighboring network devices, comprising the steps of: turning off the transmitter for a predefined time slot at one or more random moments within a downstream synchronization cycle; within the predefined time slot, receiving the synchronization signals from one or more neighboring network devices via synchronization related channels, wherein the synchronization signals comprise synchronization reference information of corresponding one or more neighboring network devices. The synchronization apparatus determines the local synchronization reference information based on the synchronization reference information of the one or more neighboring network devices. Preferably, the synchronization apparatus determines the local synchronization reference information based on the signal spatial transmission delay between two neighboring network devices and the synchronization reference information of the one or more neighboring network devices.

According to the second aspect of the present invention, there is provided a synchronization apparatus for performing synchronization in a network device of the wireless communication network based on synchronization signals from one or more neighboring network devices, comprising: a controlling means, for turning off the transmitter for a predefined time slot at one or more random moments within a downstream synchronization cycle; a receiving means for, within the predefined time slot, receiving the synchronization signals from one or more neighboring network devices via synchronization related channels, wherein the synchronization signals comprise synchronization reference information of corresponding one or more neighboring network devices. The synchronization apparatus determines the local synchronization reference information based on the synchronization reference information of the one or more neighboring network devices. Preferably, the synchronization apparatus determines the local synchronization reference information based on the signal spatial transmission delay between the two neighboring network devices and the synchronization reference information of the one or more neighboring network devices.

According to the third aspect of the present invention, there is provided a method for assisting one or more neighboring network devices to perform synchronization in a network device of the wireless communication network, comprising the steps of: determining the local synchronization reference information based on an external synchronization source; sending the local synchronization reference information to one or more neighboring network devices via air interface.

According to the fourth aspect of the present invention, there is provided a synchronization assisting apparatus, in a network device of the wireless communication network, for assisting one or more neighboring network devices to perform synchronization, comprising: a synchronization determining means, for determining the local synchronization reference information based on an external synchronization source; a synchronization notifying means, for sending the local synchronization reference information to one or more neighboring network devices via air interface.

According to the fifth aspect of the present invention, there is provided a network device in the wireless communication network, comprising: a synchronization apparatus provided by the present invention, for performing synchronization based on synchronization signals from one or more neighboring network devices.

According to the sixth aspect of the present invention, there is provided a network device in the wireless communication network, comprising: a synchronization assisting apparatus, provided by the present invention, for assisting one or more neighboring network devices to perform synchronization.

With the synchronization solution provided by the present invention, since the turning off moment of the transmitter of each base station is discretely and randomly distributed, it is guaranteed that each base station can receive synchronization reference signal from other base stations. Because the synchronization mechanism is distributed, each base station can adjust synchronization reference time independently, there is no central control node. Therefore, the synchronization method has very strong robustness.

BRIEF DESCRIPTION OF THE DRAWINGS

Below, the present invention will be further described in conjunction with the drawings.

DETAILED DESCRIPTION OF EMBODIMENTS

Figure 1:
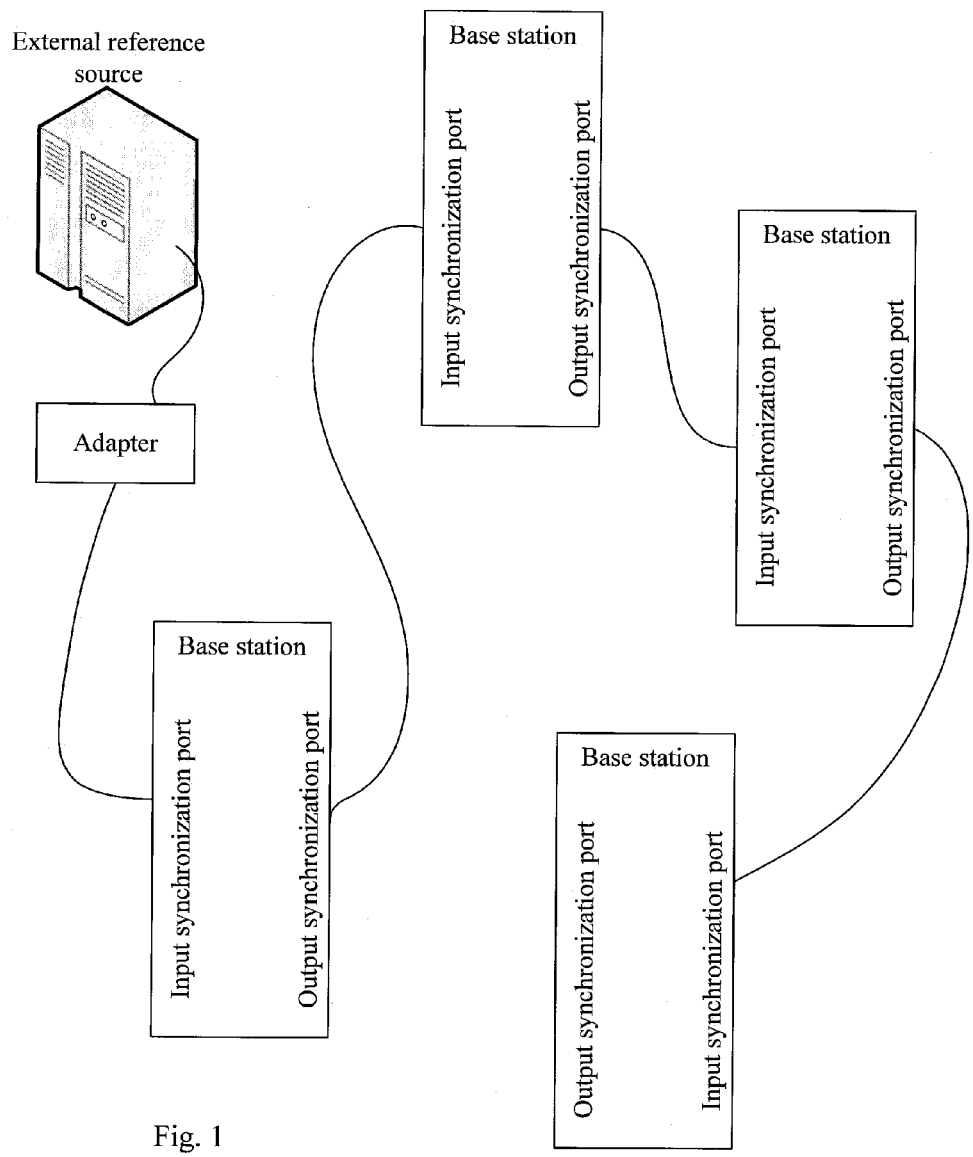
FIG. 1 illustrates a network structure of realizing the synchronization among base stations via cable link in the prior art.
Figure 2:
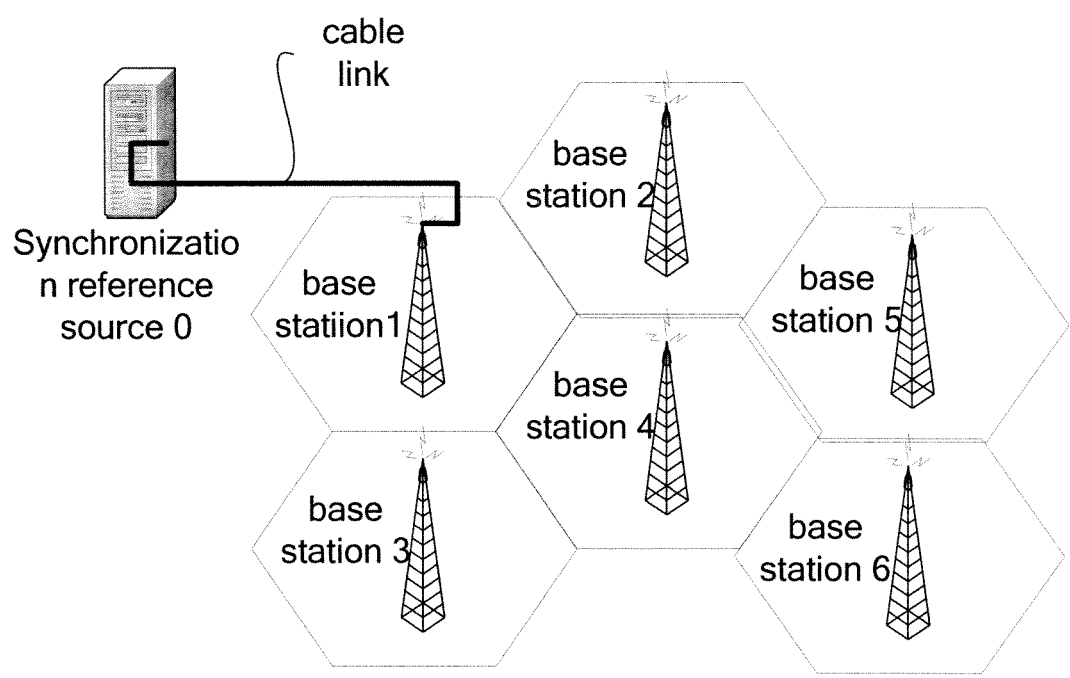
FIG. 2 illustrates a network structure with an external synchronization source according to an embodiment of the present invention.

FIG. 2 illustrates a network structure with an external synchronization source according to an embodiment of the present invention. The network comprises an external synchronization source 0 (e.g. GPS or GNSS system or atomic clock) and a plurality of base stations. Concretely, the base station 1 is connected with the external synchronization source 0 by cable link or wireless link such as microwave, infrared, laser and so on. Therefore, the base station 1 and the external synchronization source 0 can be regarded as synchronized.

The wireless network shown in FIG. 2 further comprises base stations 2 to 6. Wherein, the base stations 2, 3, 4 are adjacent to the base station 1, while the base stations 5 and 6 are far enough away from the base station 1.

Since the base station 1 is directly synchronized with the external synchronization source 0, according to the technical solution provided by the present invention, the base station 1 can be regarded as a master base station for realizing the synchronization among base stations, while other base stations shown in FIG. 2 are slave base stations. The slave base stations realize synchronization based on the downstream synchronization signal directly or indirectly from the master base station 1, namely, the base station 2, 3, 4 perform synchronization based on the downstream synchronization signal from the base station 1, while the base station 5 and 6 perform synchronization based on the synchronization signal from corresponding upstream base stations.

In usual wireless networks, since the number of base stations needed to realize strict synchronization with each other is far beyond the one shown in FIG. 2. Preferably, by connecting the external synchronization source 0 with part of the base stations via wire link, all of the base stations connected with the external synchronization source 0 can work in the same manner as that of the base station 1 shown in FIG. 2, namely they work as master base stations for synchronization.

Figure 3:
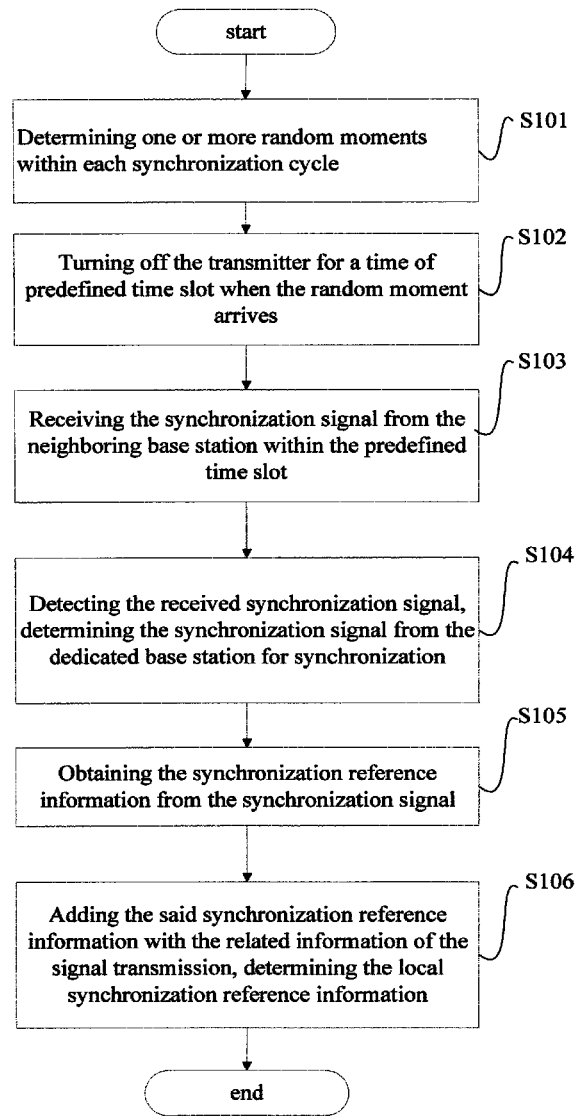
FIG. 3 illustrates the flowchart of a method for, based on synchronization signal from neighboring base stations, performing synchronization in a synchronization apparatus of a base station of the wireless communication network, according to an embodiment of the present invention.

FIG. 3 illustrates the flowchart of a method for, based on synchronization signal from neighboring base stations, performing synchronization in a synchronization apparatus of a base station of the wireless communication network, according to an embodiment of the present invention. Below, the method will be elucidated in detail with reference to FIG. 3 and in conjunction with FIG. 2. The method begins with step S101:

In FDD (Frequency Division Duplex) mode, downstream channels of upstream base stations (e.g. the base station 1) and upstream channels of downstream base stations (e.g. the base station 2) use different frequency bandwidth to separate from each other. In general, existing base stations can carry out discontinuous transmission, however, this kind of discontinuous transmission is only applicable for data transmission. For pilot signal, synchronization signal or other public control signals, the transmitting mode is not discontinuous transmission. Hence, the base station 2 can not receive the synchronization signal from the base station 1, due to the interference of its own pilot signal and synchronization signal.

In view of the aforementioned problem, in step S101, within each synchronization cycle, the base station 2 determines one or more random moments as the initial time of turning off its transmitter. Then the method comes into step S102;

In step S102, when the random moment arrives, the base station 2 turns off its own transmitter for a predefined time slot (referred to as silence time slot). For example, when the system is initializing, since all of the base stations are not synchronized, the predefined time slot is longer, such as 10 ms; after the system has run for time long enough, the predefined time slot can be correspondingly shortened, such as 0.5 ms (namely the length of a transmission time interval). Within the predefined time slot when the transmitter is turned off, the base station 2 keeping silence gets rid of its downstream power interference and can realize the receipt and detection of the downstream synchronization signal from the base station 1. Then the method enters step S103;

In step S103, in each predefined time slot within every synchronization cycle, the base station 2 receives synchronization signals from one or more neighboring base stations via the synchronization related channel (e.g. downstream pilot channel or synchronization channel), and the synchronization signals comprise synchronization reference time of corresponding neighboring base stations. Since the predefined time slot(s) of each base station is (are) determined randomly, through considering the relationship between the predefined time slot length and the synchronization cycle length of the base stations, it can be known that, within one synchronization cycle, the predefined time slot of one base stations is separate from the one of another base station. The base station 2 can receive the synchronization signal from its neighboring base stations within a predefined time slot. Then the method comes into step S104;

In step S104, the base station 2 detects the synchronization signal from aforementioned one or more neighboring base stations. As described above, in the network shown in FIG. 2, as the master base station for synchronization, the base station 1 sends synchronization signals downstream. The base station 2 is directly adjacent to the base station 1, and can receive and detect the synchronization signal from the base station 1 under the prerequisite that it turns off the transmitter to eliminate its downstream channel interference. And within the same predefined time slot when the base station 2 turns off the transmitter, signals arriving at the receiver of the base station 2 further comprise synchronization signals from other base stations adjacent to the base station 2 (including but not limited to the base stations 4 and 5). As compared with these base stations, the base station 2 is at the same or a higher level in the synchronization mechanism. Hence, synchronization signals from these base stations are useless for the base station 2. The base station 2 only needs to detect the needed synchronization signal among the received synchronization signals from one or more neighboring base stations, namely the synchronization signal from the base station 1. After detecting the synchronization signal from the base station 1 successfully, the method enters step S105;

In step S105, from the synchronization signal from the base station 1, the base station 2 obtains the needed synchronization reference time for generating the new local synchronization reference time. Then the method comes into step S106;

In step S106, the base station 2 has successfully obtained the synchronization reference time of the base station 1 through aforementioned steps and pre-stored (preferably, measures and stores when the system is initializing) the signal transmission related information (e.g. signal spatial transmission delay) between it and the base station 1 as time compensation. By simply adding the synchronization reference time of the base station 1 to the signal spatial transmission delay, the new local synchronization reference time can be obtained;

Hereto, the base station 2 realizes the synchronization with the base station 1 according to an embodiment of the present invention. It should be understood that the base station 2 can omit the signal transmission delay between it and the base station 1 and directly take the synchronization reference time from the base station 1 as the local synchronization reference time.

The synchronization process of the base station 2 adjacent to the base station 1 has been described above. For the base station 5 far away from the base station 1, since it can not detect the synchronization signal sent by the base station 1, in order to realize synchronization with the base station 1, it needs relay.

According to a preferred embodiment of the present invention, the base station 2 is designated as the synchronization dedicated network device (base station) of the base station 5. Then the base station 5, within each predefined time slot determined randomly, receives and detects the synchronization signal from the base station 2 by turning off the transmitter, and obtains its synchronization reference time there from. The synchronization reference time is then added to the pre-stored signal spatial transmission delay between the base station 5 and the base station 2 to get the new local synchronization reference time.

Figure 4:
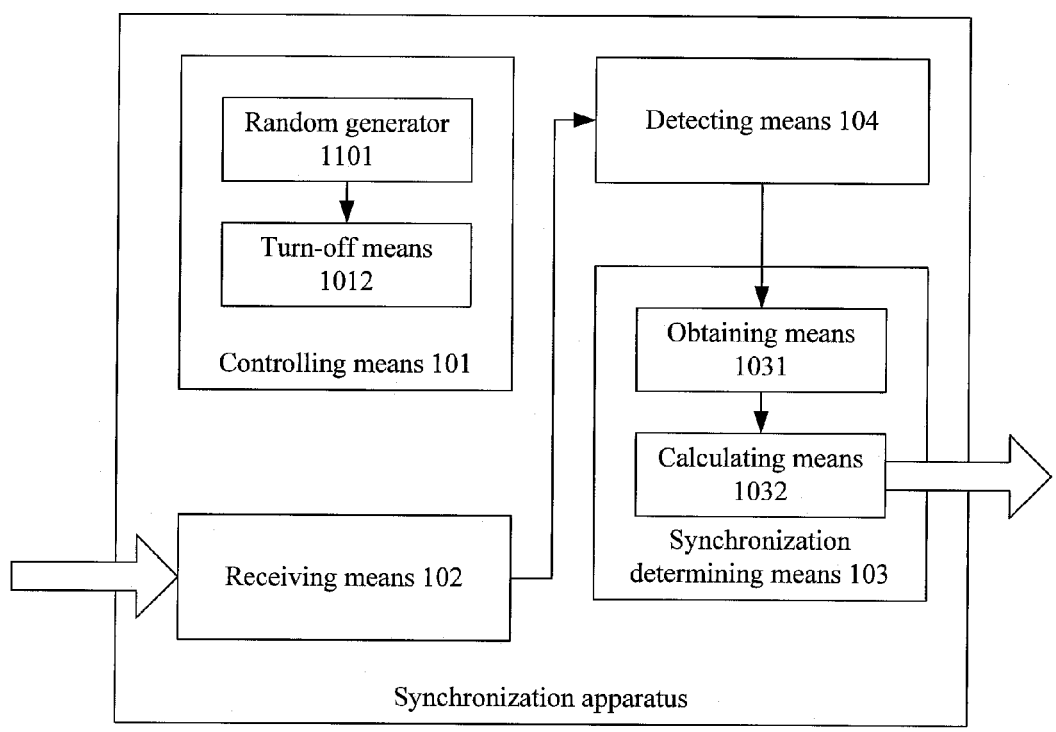
FIG. 4 illustrates a block diagram of the synchronization apparatus for, based on synchronization signal from neighboring base stations, performing synchronization in a base station of the wireless communication network, according to an embodiment of the present invention.

FIG. 4 illustrates a block diagram of the synchronization apparatus for, based on synchronization signal from neighboring base stations, performing synchronization in a base station of the wireless communication network, according to an embodiment of the present invention. Below, the synchronization apparatus will be elucidated in detail with reference to FIG. 4 and in conjunction with FIG. 2.

The synchronization apparatus concretely comprises: a controlling means 101, a receiving means 102, a synchronization determining means 103 and a detecting means 104. Wherein, the controlling means 101 comprises a random generating means 1011 and a turn-off means 1012; the synchronization determining means 103 comprises an obtaining means 1031 and a calculating means 1032.

In FDD (Frequency Division Duplex) mode, downstream channels of upstream base stations (e.g. the base station 1) and upstream channels of downstream base stations (e.g. the base station 2) use different frequency bandwidth to separate from each other. In general, existing base stations can carry out discontinuous transmission, however, this kind of discontinuous transmission is only applicable for data transmission. For pilot signal, synchronization signal or other public control signals, the transmitting mode is not discontinuous transmission. Hence, the base station 2 can not receive the synchronization signal from the base station 1, due to the interference of its own pilot signal and synchronization signal. In view of the above mentioned problem, within each synchronization cycle, the random generating means 1011 determines one or more random moments as the initial time of turning off its own transmitter;

When the random moment arrives, the turn-off means 1012 turns off the transmitter of the base station 2 for a predefined time slot. For example, when the system is initializing, since all of the base stations are not synchronized, the predefined time slot is longer, such as 10 ms; after the system has run for time long enough, the predefined time slot can be correspondingly shortened, such as 0.5 ms (namely the length of a transmission time interval). Within the predefined time slot when the transmitter is turned off, the base station 2 keeping silence gets rid of its downstream power interference and can realize the receipt and detection of the downstream synchronization signal from the base station 1;

The receiving means 102 is responsible for, in each predefined time slot within every synchronization cycle, receiving synchronization signals from one or more neighboring base stations via the synchronization related channel (e.g. downstream pilot channel or synchronization channel). The synchronization signals comprise synchronization reference time of corresponding neighboring base stations. Since the predefined time slot(s) of each base station is(are) determined randomly, through considering the relationship between the predefined time slot length and the synchronization cycle length of the base stations, it can be known that, within one synchronization cycle, the predefined time slot of a base station is separate from the one of another base station. The base station 2 can receive the synchronization signals from its neighboring base stations within a predefined time slot;

The detecting means 104 detects the synchronization signals from aforementioned one or more neighboring base stations. As described above, in the network shown in FIG. 2, as the master base station for synchronization, the base station 1 sends synchronization signals downstream. The base station 2 is directly adjacent to the base station 1, and can receive and detect the synchronization signal from the base station 1 under the prerequisite that it turns off the transmitter to eliminate its downstream channel interference. And within the same predefined time slot when the base station 2 turns off the transmitter, signals arriving at the receiver of the base station 2 further comprise synchronization signals from other base stations adjacent to the base station 2 (including but not limited to the base stations 4 and 5). As compared with these base stations, the base station 2 is at the same or a higher level in the synchronization mechanism. Hence, synchronization signals from these base stations are useless for the base station 2. The base station 2 only needs to detect the needed synchronization signal among the received synchronization signals from one or more neighboring base stations, namely the synchronization signal from the base station 1;

The obtaining means 1031 obtains the synchronization reference time needed by the base station 2 from the synchronization signal from the base station 1 to generate the new local synchronization reference time and forwards the obtained synchronization reference time to the calculating means 1032;

The base station 2 has successfully obtained the synchronization reference time of the base station 1 through aforementioned steps and pre-stored (preferably, measures and stores it in a storing means, when the system is initializing, for conciseness, the storing means is not shown in the figure) the signal transmission related information (e.g. signal spatial transmission delay) between it and the base station 1 as time compensation. By simply adding the synchronization reference time of the base station 1 to the signal spatial transmission delay, the new local synchronization reference time can be obtained;

Hereto, the base station 2 realizes the synchronization with the base station 1 according to an embodiment of the present invention. It should be understood that the base station 2 can omit the signal transmission delay between it and the base station 1 and directly take the synchronization reference time from the base station 1 as the local synchronization reference time.

For the base station 5 far away from the base station 1, since it can not detect the synchronization signal sent by the base station 1, in order to realize synchronization with the base station 1, it needs relay.

According to a preferred embodiment of the present invention, the base station 2 is designated as the synchronization dedicated network device (base station) of the base station 5. Then the base station 5, within each predefined time slot determined by the random generating means 1011, turns off the transmitter through the turn-off means 1012, receives synchronization signals from one or more neighboring base stations through the receiving means 102, after the detection through the detecting means 104, gets the synchronization signal from the base station 2, obtains its synchronization reference time through the obtaining means 1031 there from. The synchronization reference time is then forwarded to the calculating means 1032 to by which it is added to the prestored signal spatial transmission delay between the base station 2 and the base station 5 to obtain the new local synchronization reference time.

Figure 5:
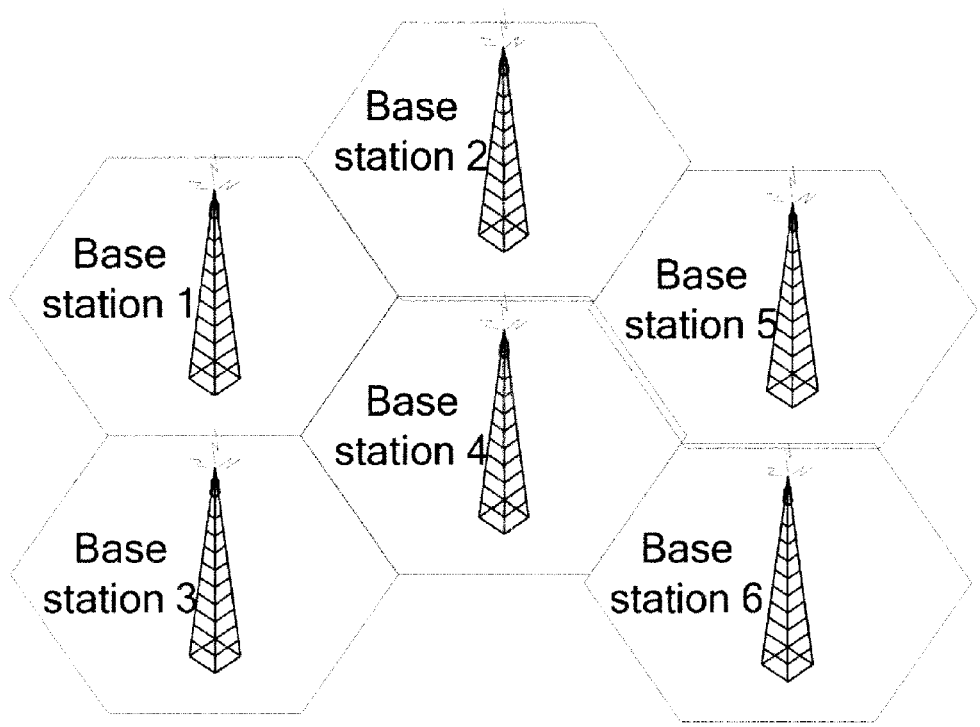
FIG. 5 illustrates a network structure without external reference source, according to an embodiment of the present invention.

FIG. 5 illustrates a network structure without external reference source, according to an embodiment of the present invention. Below, the present invention will be elucidated further with reference to FIG. 5 and in conjunction with FIG. 3.

The only difference between the network shown in FIG. 5 and the one shown in FIG. 2 is that there is no external synchronization source in the network shown in FIG. 5. In this case, according to an embodiment of the present invention (since this embodiment is similar to the aforementioned embodiment with reference to FIG. 3 and in conjunction with FIG. 2, for conciseness, herein only brief description will be made):

Through designation, the system acknowledges one or more base stations as synchronization source of the network, without loss of generality, suppose the base station as the synchronization source, then other base stations regard the base station 1 as the reference of the synchronization;

Base stations directly adjacent to the base station 1, such as the base station 2 (as the synchronization dedicated base station of the base station 5), receive and detect the synchronization signal from the base station 1 to generate the new local synchronization reference time;

After receiving synchronization signals from one or more neighboring base stations, the base station 5 detects the synchronization signal from the base station 2 (the synchronization dedicated base station of the base station 5) there from, in order to generate new local synchronization reference time.

Preferably, the connection between synchronization sources designated by the system is realized by means of cable link. By using cable link to transmit synchronization signals, high level synchronization is maintained among all synchronization sources.

According to a preferred embodiment of the present invention, for the circumstances shown in FIG. 5 that there is no external synchronization source, the method shown in FIG. 3 corresponds to:

In step S101, within each synchronization cycle, the base station 2 determines one or more random moments as the initial time of turning off its transmitter. Then the method comes into step S102;

In step S102, when the random moment arrives, the base station 2 turns off its own transmitter for a predefined time slot. For example, when the system is initializing, since all base stations are not synchronized, the predefined time slot is longer, such as 10 ms; after the system has run for time long enough, the predefined time slot can be correspondingly shortened, such as 0.5 ms (namely the length of a transmission time interval). Within the predefined time slot when the transmitter is turned off, the base station 2 keeping silence gets rid of its downstream power interference and can realize the receipt and detection of the downstream synchronization signal from neighboring base stations. Then the method enters step S103;

In step S103, in each predefined time slot within every synchronization cycle, the base station 2 receives synchronization signals from one or more neighboring base stations via the synchronization related channel (e.g. downstream pilot channel or synchronization channel), and the synchronization signals comprise synchronization reference time of corresponding neighboring base stations. Since the predefined time slot(s) of each base station is(are) determined randomly, through considering the relationship between the predefined time slot length and the synchronization cycle length of the base stations, it can be known that, within one synchronization cycle, the predefined time slot of one base station is separate from the one of another base station. The base station 2 can receive the synchronization signal from its neighboring base stations within a predefined time slot. Then the method comes into step S104;

In step S104, the base station 2 detects the aforementioned synchronization signals from one or more neighboring base stations. Preferably, the base station 2 detects, from all received synchronization signals, three or more synchronization signals from the base station(s) which is (are) closest to the base station 2 (it can be realized by detecting the power of the signals), then the method comes into step S105;

In step S105, the base station 2 obtains its needed synchronization reference time from the detected multiple synchronization signals and the method enters step S106;

In step S106, the base station 2 has successfully obtained synchronization reference time of multiple neighboring base stations through aforementioned steps and pre-stored (preferably, measures and stores when the system is initializing) the signal transmission related information (e.g. equivalent compensation value, which is negative, of signal spatial transmission delay) between it and these base stations as time compensation. By simply averaging the obtained synchronization reference time of multiple neighboring base stations and then adding the above average to the equivalent compensation value of the signal spatial transmission delay, the new local synchronization reference time can be obtained. Wherein, suppose the distance among base stations is 500 m, then the equivalent compensation value of the signal spatial transmission delay should be $-500 \text{ m}/3*10^8 \text{ m/s}=-1.67 \text{ μs}$. The reason for considering the compensation value is that, if all of the base stations are synchronized, synchronization signals of neighboring base stations received by the base station 2 are supposed to have been sent before the base station 2 sends its synchronization signal, the equivalent compensation value is the signal spatial transmission delay among base stations.

Hereto, the base station 2 realizes the synchronization with corresponding neighboring base stations according to an embodiment of the present invention.

Below, the synchronization apparatus proposed by the present invention will be further described with reference to FIG. 5 and in conjunction with FIG. 4.

The only difference between the network shown in FIG. 5 and the one shown in FIG. 2 is that there is no external synchronization source in the network shown in FIG. 5. In this case, according to an embodiment of the present invention (since this embodiment is similar to the aforementioned embodiment with reference to FIG. 3 and in conjunction with FIG. 2, for conciseness, herein only brief description will be made):

Through designation, the system acknowledges one or more base stations as synchronization source of the network, without loss of generality, suppose the base station as the synchronization source, then other base stations regard the base station 1 as the reference of the synchronization;

After receiving synchronization signals from multiple neighboring base stations through the receiving means 102 within the predefined time slot determined by the random generating means, base stations directly adjacent to the base station 1, such as the base station 2 (as the synchronization dedicated base station of the base station 5) detects the synchronization signal from the base station 1 through the detecting means 104. Then, the obtaining means 1031 obtains synchronization reference time therein and forwards it to the calculating means 1032 to generate the new local synchronization reference time;

After receiving synchronization signals from one or more neighboring base stations, the base station 5 detects the synchronization signal from the base station 2 (the synchronization dedicated base station of the base station 5) there from, in order to generate new local synchronization reference time.

Preferably, the connection between synchronization sources designated by the system is realized by means of cable link. By using cable link to transmit synchronization signals, high level synchronization is maintained among all synchronization sources.

According to a preferred embodiment of the present invention, for the circumstances shown in FIG. 5 that there is no external synchronization source:

The random generating means 1011 determines, within each synchronization cycle, one or more random moments as the initial time of turning off the transmitter of the base station 5;

When the random moment arrives, the turn-off means 1012 turns off the transmitter of the base station 2 for a predefined time slot. For example, when the system is initializing, since all of the base stations are not synchronized, the predefined time slot is longer, such as 10 ms; after the system has run for time long enough, the predefined time slot can be correspondingly shortened, such as 0.5 ms (namely the length of a transmission time interval). Within the predefined time slot when the transmitter is turned off, the base station 2 keeping silence gets rid of its downstream power interference and can realize the receipt and detection of the downstream synchronization signal from neighboring base stations.

The receiving means 102 receives, in each predefined time slot within every synchronization cycle of the base station 2, synchronization signals from one or more neighboring base stations via the synchronization related channel (e.g. downstream pilot channel or synchronization channel). The synchronization signals comprise synchronization reference time of corresponding neighboring base stations. Since the predefined time slot(s) of each base station is(are) determined randomly, through considering the relationship between the predefined time slot length and the synchronization cycle length of the base stations, it can be known that, within one synchronization cycle, the predefined time slot of a base station is separate from the one of another base station. The base station 2 can receive the synchronization signals from its neighboring base stations within a predefined time slot;

The detecting means 104 detects the aforementioned synchronization signals from one or more neighboring base stations. Preferably, The detecting means 104 detects, from all received synchronization signals, three or more synchronization signals from the base station(s) which is(are) closest to the base station 2 (it can be realized by detecting the power of the signals);

The obtaining means 1031 obtains the needed synchronization reference time from the detected multiple synchronization signals;

The base station 2 has successfully obtained synchronization reference time of multiple neighboring base stations through aforementioned steps and pre-stored (preferably, measures and stores when the system is initializing) the signal transmission related information (e.g. equivalent compensation value, which is negative, of signal spatial transmission delay) between it and these base stations as time compensation. By simply averaging the obtained synchronization reference time of multiple neighboring base stations through the calculating means 1032, and then adding the above average to the equivalent compensation value of the signal spatial transmission delay, the new local synchronization reference time can be obtained. Wherein, suppose the distance among base stations is 500 m, then the equivalent compensation value of the signal spatial transmission delay should be $-500\,m/3*10^8\,m/s=-1.67\,\mu s$. The reason for considering the compensation value is that, if all of the base stations are synchronized, synchronization signals of neighboring base stations received by the base station 2 are supposed to have been sent before the base station 2 sends its synchronization signals, the equivalent compensation value is the signal spatial transmission delay among base stations.

Hereto, the base station 2 realizes the synchronization with corresponding neighboring base stations according to an embodiment of the present invention.

Figure 6:
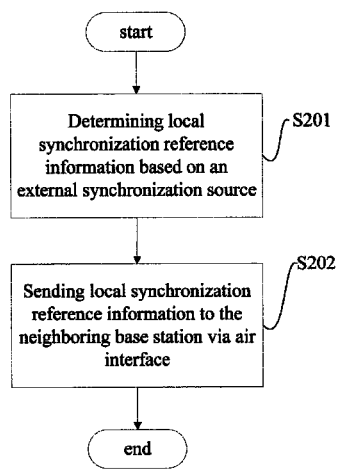
FIG. 6 illustrates the flowchart of a method for, in a base station of the wireless communication network, assisting neighboring base stations to perform synchronization, according to an embodiment of the present invention.

FIG. 6 illustrates the flowchart of a method for, in a base station of the wireless communication network, assisting neighboring base stations to perform synchronization, according to an embodiment of the present invention. Below, the method will be described with reference to FIG. 6 and in conjunction with FIG. 2, it starts with step S201:

In step 201, the base station 1 determines the local synchronization reference information based on the external synchronization source 0. Although not shown in the figure, it should be understood that, in order to realize high level synchronization with the external synchronization source 0, other master base stations are also required to be connected with the external synchronization source 0 by means of cable or wireless link, such as microwave, infrared, laser and so on. When other master base stations can not be directly connected with the external synchronization source 0, the aforementioned synchronization can be realized by connecting them with the base station 1, at this time, these base stations receive synchronization signal from the base station 1 via cable link;

In step S202, the base station 1 sends the local synchronization reference information to neighboring base stations in the form of synchronization signal in the synchronization related channel (e.g. downstream pilot channel or synchronization channel) via the air interface.

Figure 7:
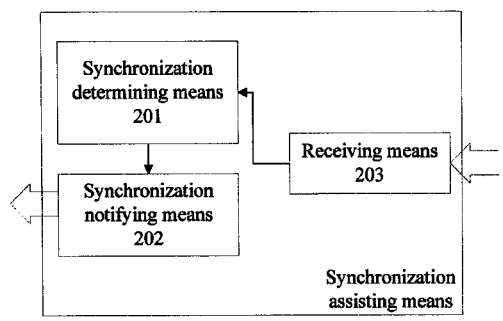
FIG. 7 illustrates a block diagram of the synchronization assisting apparatus for in a base station of the wireless communication network, assisting neighboring base stations to perform synchronization, according to an embodiment of the present invention.

FIG. 7 illustrates a block diagram of the synchronization assisting apparatus, used in a base station of the wireless communication network, for assisting neighboring base stations to perform synchronization, according to an embodiment of the present invention. Below, the synchronization assisting apparatus will be described with reference to FIG. 7 and in conjunction with FIG. 2. The synchronization assisting apparatus concretely comprises: a synchronization determining means 201, a synchronization notifying means 202 and a receiving means 203.

In the base station 1, the synchronization determining means 201 determines the local synchronization reference information based on the external synchronization source 0;

The synchronization notifying means 202 sends the local synchronization reference information of the base station 1 to neighboring base stations in the form of synchronization signal in the synchronization related channel (e.g. downstream pilot channel or synchronization channel) via the air interface.

Although not shown in FIG. 2, it should be understood that, in order to realize high level synchronization with the external synchronization source 0, other master base stations are also required to be connected with the external synchronization source 0 by means of cable or wireless link, such as microwave, infrared, laser and so on. When other master base stations can not be directly connected with the external synchronization source 0, the aforementioned synchronization can be realized by connecting them with the base station 1, at this time, the receiving means 203 in the synchronization assisting apparatus of these base stations receive synchronization signal from the base station 1 via cable link;

The synchronization determining means 201 then determines the local synchronization reference time of the base station based on the synchronization reference time contained in the synchronization signal from the base station 1.

Although the embodiments of the present invention have been described above, it should be understood by those skilled in the art that the present invention is not limited to the abovementioned specific embodiments, various modifications can be made without departing from the scope and spirit of the scope of the attached claims.

What is claimed is:

1. A method, in a synchronization apparatus of a synchronization dedicated base station of a wireless communication network, for performing synchronization based on synchronization signals from one or more neighboring network devices, comprising:
 a. turning off a transmitter for a predefined time slot at one or more random moments within each downstream synchronization cycle;
 b. within the predefined time slot, receiving the synchronization signals from the one or more neighboring network devices via synchronization related channels, wherein the synchronization signals comprise synchronization reference information of the one or more neighboring network devices; and
 c. determining local synchronization reference information based on the synchronization reference information of the one or more neighboring network devices and on pre-stored signal transmission related information;
 detecting the received synchronization signals from the one or more neighboring network devices and determining a synchronization signal from the synchronization dedicated base station; and
 c1'. determining the local synchronization reference information based on the pre-stored signal transmission related information and the determined synchronization reference information in the synchronization signal from the synchronization dedicated base station.

2. The method according to claim 1, further comprising:
 a1. determining the one or more random moments within each downstream synchronization cycle;
 a2. turning off the transmitter for a predefined time slot when the random moment arrives.

3. The method according to claim 1, further comprising:
 c1: from the received synchronization signals from the one or more neighboring network devices, obtaining the synchronization reference information of the one or more neighboring network devices;

c2: adding the obtained synchronization reference information to the pre-stored signal transmission related information so as to determine the synchronization reference information of the network device.

4. The method according to claim 1, wherein the signal transmission related information comprises: signal spatial transmission delay between the synchronization dedicated base station and the one or more neighboring network devices.

5. The method according to claim 1, wherein the synchronization related channels comprise: downstream pilot channels and synchronization channels.

6. A synchronization apparatus, in a synchronization dedicated base station of a wireless communication network, for performing synchronization based on synchronization signals from one or more neighboring network devices, comprising:

a controller processor configured to turn off a transmitter for a predefined time slot at one or more random moments within each downstream synchronization cycle;

a receiver configured to, within the predefined time slot, receive the synchronization signals from the one or more neighboring network devices via synchronization related channels, wherein the synchronization signals comprise synchronization reference information of the one or more neighboring network devices;

a synchronization processor configured to determine local synchronization reference information based on pre-stored signal transmission related information and the synchronization reference information of the one or more neighboring network devices; and a detector configured to detect the received synchronization signals from the one or more neighboring network devices and determining the synchronization signal from the synchronization dedicated base station;

the synchronization processor being further configured to determine local synchronization reference information based on pre-stored signal transmission related information and the synchronization reference information obtained from the synchronization signal of the synchronization dedicated base station.

7. The synchronization apparatus according to claim 6, wherein, the controller processor is further configured to:

execute a random generator configured to determine the one or more random moments within each downstream synchronization cycle; and turn off the transmitter for a predefined time slot when the random moment arrives.

8. The synchronization apparatus according to claim 6, wherein, the synchronization processor is further configured to:

execute an obtaining module configured to obtain the synchronization reference information of the one or more neighboring network devices from the received synchronization signals from the one or more neighboring network devices;

execute a calculating module configured to add the obtained synchronization reference information of the one or more neighboring network devices to the pre-stored signal transmission related information so as to determine the local synchronization reference information.

9. The synchronization apparatus according to claim 6, wherein the signal transmission related information comprises: signal spatial transmission delay between the synchronization dedicated base station and the one or more neighboring network devices.

10. The synchronization apparatus according to claim 6, wherein the synchronization related channels comprise: downstream pilot channels and synchronization channels.

* * * * *